June 2, 1970  J. KARMAZIN  3,515,208
HEAT EXCHANGER CONSTRUCTION
Filed June 23, 1967  2 Sheets-Sheet 1
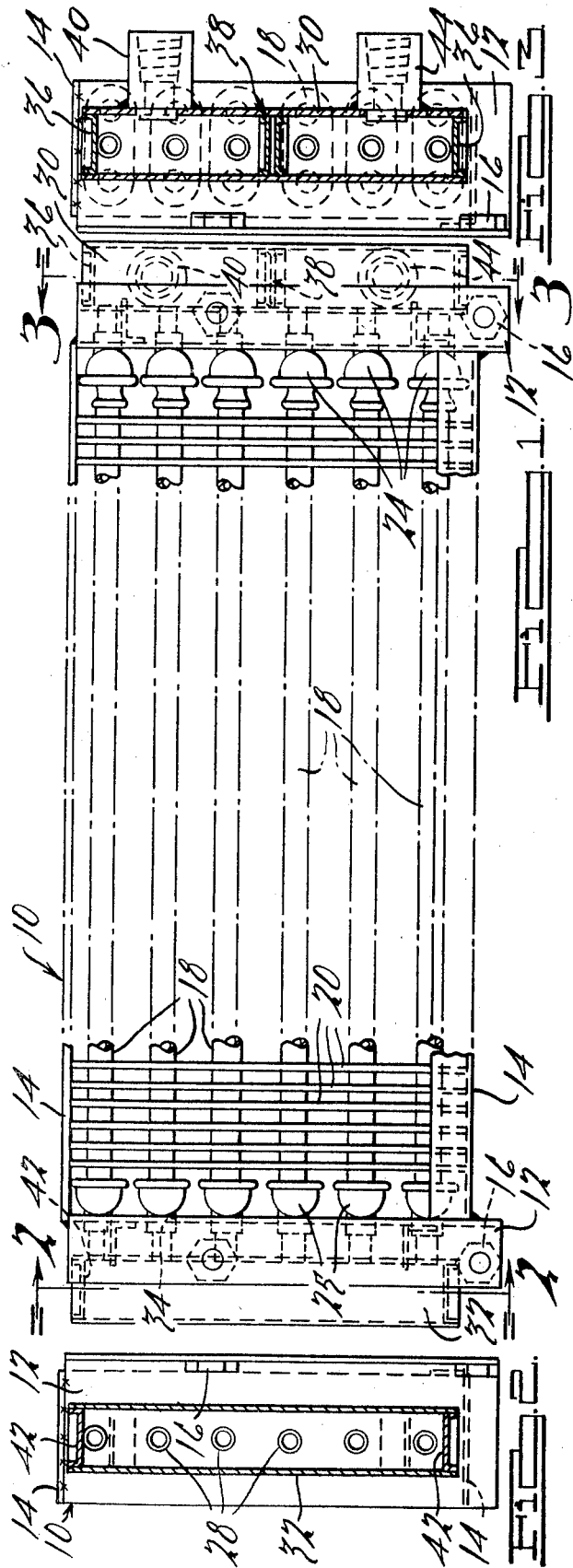
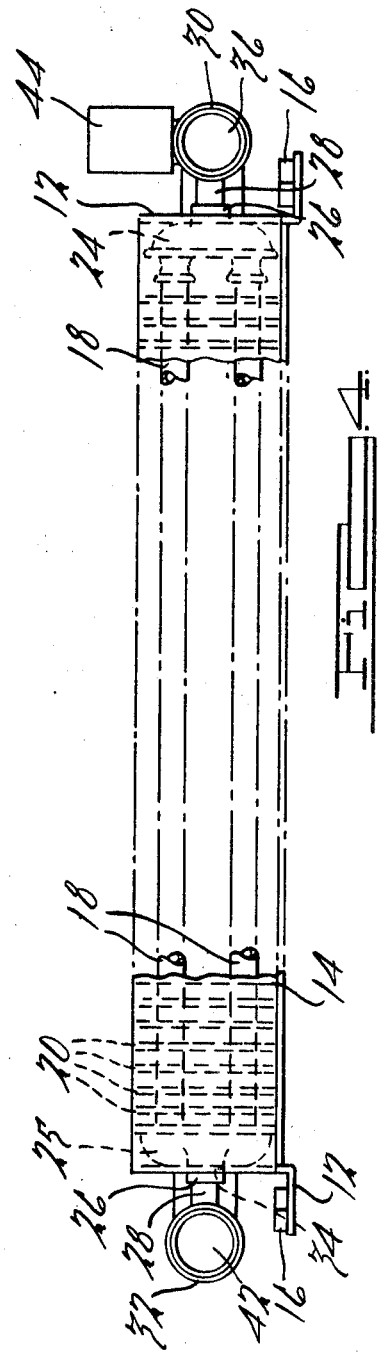
INVENTOR.
John Karmazin
BY
Harness, Dickey & Pierce
ATTORNEYS

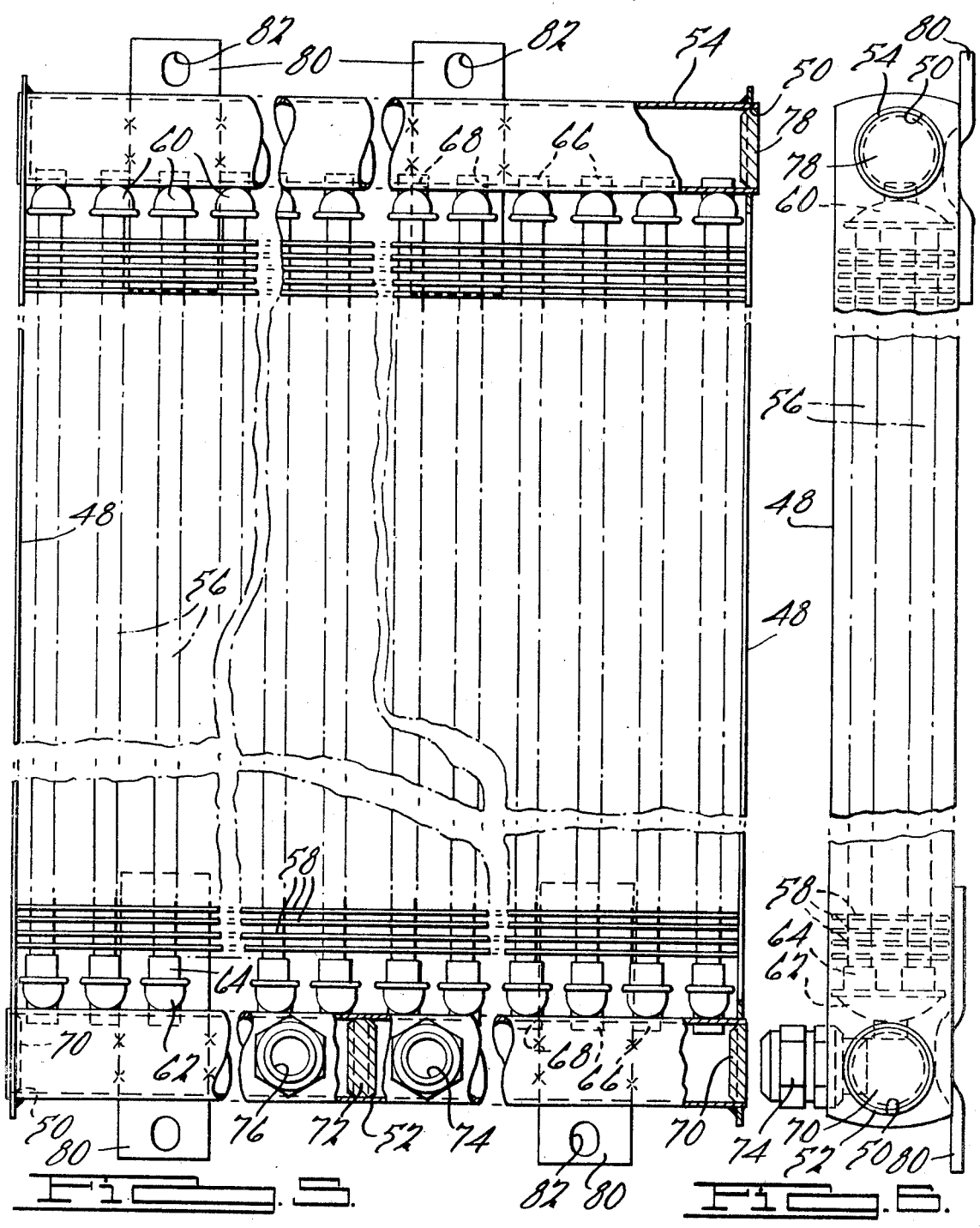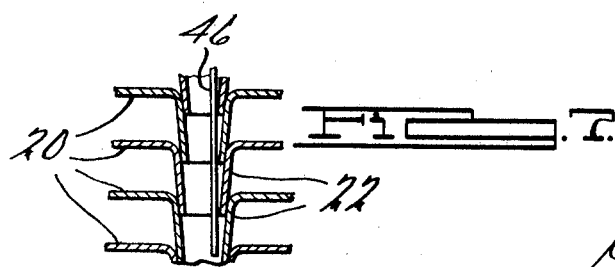

United States Patent Office 3,515,208
Patented June 2, 1970

3,515,208
HEAT EXCHANGER CONSTRUCTION
John Karmazin, 3776 11th St.,
Wyandotte, Mich. 48192
Filed June 23, 1967, Ser. No. 648,314
Int. Cl. F28f 1/00
U.S. Cl. 165—178      7 Claims

ABSTRACT OF THE DISCLOSURE

A heat exchanger and method for making a heat exchanger consisting of a rectangular framework, within which a plurality of spaced parallel sheets of material are disposed having spaced-apart integral tapered tubular projections positioned in aligned nested relationship defining a plurality of conduits extending and clamping between opposed sides of the framework. The assembly is brazed in a furnace, effecting a bonding and sealing of the joints formed by the projections and the connections of the framework forming an integral structure of accurate dimension and of increased durability and ruggedness.

BACKGROUND OF THE INVENTION

The present invention is directed to heat exchangers of the fin and tube type which are formed by a stack of sheets disposed in substantially parallel relationship and which sheets are formed with integral tapered tubular projections that are disposed in mutual aligned nested relationship defining therewith a plurality of conduits. The sheet portion serves as a heat radiating or receiving fin for transferring the heat from and to the conduits through which a fluid is adapted to be transmitted.

It has been conventional in a manufacture of heat exchangers of the aforementioned type to form the individual sheets by passing them incrementally through a progressive die, whereafter they are nested and placed in a suitable clamping fixture. The clamping fixture maintains the nested stack of sheets in appropriate assembled relationship and the resultant assembly is thereafter placed in a brazing furnace with a brazing material positioned adjacent to the joints formed between the tubular projections whereby a concurrent bonding and sealing of the joints occurs. After removal of the assembly from the brazing furnace and a cooling of the stacked sheets, the heat exchanger core, comprising the integrally brazed fin and tubes, are removed from the fixture and subjected to further final assembly operations.

The foregoing manufacturing technique has been found to be cumbersome in many respects necessitating a large inventory and capital investment in jigs and fixtures for accommodating nested stacks of the deformed sheets to produce heat exchanger cores of various sizes and surface areas to provide heat exchanging capacities and/or configurations consistent with their intended end use. The loading of such stacked nested assemblies in the fixtures prior to brazing and subsequent removal of the brazed core from the fixture constitutes a tedious and time consuming operation. It has also been noted that the subjection of such jigs and clamping fixtures to repeated cycling between elevated temperatures as encountered in the brazing furnace and room temperature occasions a progressive warping and distortion of the fixture, whereby variations occur in the dimensions of the heat exchanger cores produced. Such warping and distortion of the clamping fixtures has, in some instances, also resulted in inadequate clamping forces in localized areas of the nested sheet assembly, whereupon leakage of the heat exchanger core in certain localized areas is caused due to excessive gaps which are not adequately sealed by the bonding or brazing material employed.

A further problem associated in the manufacture of fin and tube heat exchangers is the fragile nature of the brazed or soldered assembly after removal from the clamping fixture, necessitating care in the handling of such assemblies during further processing and work operations to be performed thereon to avoid physical damage thereto.

The present invention overcomes the foregoing disadvantages in the manufacture and construction of fin and tube type heat exchangers by employing a framework which becomes an integral part of the resultant heat exchangers dispensing with the need of separate clamping fixtures and further substantially enhancing the dimensional accuracy and ruggedness of the heat exchanger apparatus produced.

SUMMARY OF THE INVENTION

The foregoing and other advantages and benefits of the present invention are achieved by a fin and tube type heat exchanger construction employing a rectangular framework including a pair of end members and a pair of side members, between which a plurality of parallel spaced sheets of a heat conductive material are disposed and are formed with spaced integral tapered tubular projections which are positioned in aligned nested relationship and are retained in appropriate clamped relationship between the end members of the framework. The resultant assembly is brazed as a unit employing a suitable solder or brazing compound forming a unitary assembly having the protective framework extending around the core, which prevents physical damage to the side edges of the heat exchanger, while concurrently assuring consecutive accuracy in the dimensions in the heat exchanger produced. The construction and method of making the heat exchanger apparatus, as hereinafter described in detail, dispenses with the need of a large inventory and capital investment in special jigs and fixtures which themselves must be periodically replaced due to wear and warpage. Substantial increases in the efficiency of manufacture and in the economy and durability of the heat exchangers produced is also attained.

Additional benefits and advantages of the present invention will become apparent upon a reading of the preferred embodiments of the invention taken in conjunction with the accompanying drawings.

BRIEF DESCRIPTION OF THE DRAWINGS

FIG. 1 is a plan view of a fin and tube type heat exchanger constructed in accordance with one of the embodiments comprising the present invention;

FIG. 2 is a transverse sectional view through one end of the heat exchanger as shown in FIG. 1 and taken substantially along the line 2—2 thereof;

FIG. 3 is a transverse sectional view through the other end of the heat exchanger shown in FIG. 1 and taken substantially along the line 3—3 thereof;

FIG. 4 is a side elevational view of the heat exchanger shown in FIG. 1;

FIG. 5 is a plan view, partly in section, of a fin and tube type heat exchanger constructed in accordance with an alternative satisfactory embodiment of the present invention;

FIG. 6 is a side elevational view of the heat exchanger shown in FIG. 5; and

FIG. 7 is a fragmentary magnified sectional view illustrating the nested aligned relationship of the tubular projections integrally formed on the stacked sheets.

DESCRIPTION OF THE PREFERRED EMBODIMENTS

Referring now in detail to the drawings, and as may be best seen in FIG. 1 to 4, a heat exchanger constructed in accordance with the practice of the present invention comprises a framework 10 consisting of a pair of L-shaped end panels or members 12, interconnected at their end portions by a pair of parallel spaced side panels or members 14. As best seen in FIG. 4, the oppositely-extending flanges of the end panels 12 are provided with nuts 18 affixed at laterally spaced increments therealong for threadably securing the heat exchanger to a suitable mounting platform or base.

A plurality of conduits 18 extend in paired laterally spaced parallel relationship between the end panels 12 and are formed by means of a plurality of spaced parallel sheets 20 extending between the side panels 14. As best seen in FIG. 7, each of the sheets 20 are formed with a series of tapered tubular projections 22, which are disposed in aligned nested relationship with corresponding tubular projections on adjacent sheets forming a telescopic tubular wall defining the conduits 18. The sheets 20 serve as heat radiating or transfer fins for conducting heat to or from a fluid adapted to be circulated through the conduits of the heat exchanger.

As shown in FIGS. 1–4, one of the ends of the conduits 18 are connected in pairs and slidably received in a U-shaped manifold 24 formed with an outlet 26 projecting from the bight portion thereof, which in turn is connected by means of a nipple 28 to a header conduit 30 disposed outwardly of and substantially parallel to the end panel 12. The other ends of the conduits 18 slidably overlie and are connected to U-shaped manifolds 25 similarly having an outlet 26 connected by a nipple 28 to the header conduit 32. As will be noted, each of the end panels 12 is formed with a plurality of spaced apertures 34 for receiving the outlet 26 of the U-shaped manifolds 24, 25, such that the bight portion of the manifolds is disposed in firm seated relationship against the surface of the end panel. In accordance with this arrangement, the clamping thrust of the end panels is transmitted by the manifolds 24, 25 to the stacked sheets, maintaining the tubular projections in appropriate nested relationship.

The header conduit 30 is of a circular cross section and is provided with end caps 36 and a centrally disposed plug 38 defining two non-communicating chambers. An inlet 40 is mounted in communication with one of the chambers for delivering a suitable fluid thereto for circulation through the conduits 18 connected thereto to the opposite header conduit 32. The header conduit 32 similarly is provided with end plugs 42 and may be further provided with suitable baffles for directionally guiding the fluid passing therethrough. The other chamber of the header conduit 30 is provided with an outlet 44 through which the fluid is transmitted to the system containing the heat exchanger.

In the manufacture of the heat exchanger, as shown in FIGS. 1–4, the framework 10 is first assembled by securing the ends of the side panels 14 to one of the end panels 12 and thereafter a plurality of the sheets 20 are positioned in appropriate stacked relationship such that the tubular projections are in nested alignment as shown in FIG. 7. The U-shaped manifolds 24, 25 are placed in appropriate position with the outlets 26 extending through the apertures 34 in the end panels and with the outlet ends of the U-shaped portion in communication with the conduits defined by the tubular projections. The opposite end panel thereafter is secured to the side panels whereby the stacked sheets are placed in appropriate clamped relationship assuring uniform nested relationship between the tubular projections on the spaced sheets. A suitable sealing and bonding material, such as a metallic solder or brazing metal, is placed in the interior of the tubular projections, such as a brazing rod 46 as shown in FIG. 7, and the assembly as such is placed in a brazing furnace in which it is heated to an elevated temperature at which the brazing compound melts and flows by capillary action around the joints formed between the nested tubular projections, effecting a sealing and bonding thereof into an integral unit. In accordance with a preferred embodiment, the side edges of the sheets 20 are also supplied with a brazing compound whereby the edges of the sheets are at least partially affixed to the side panels further enhancing the structural integrity and strength of the heat exchanger unit. It will be appreciated, depending on the specific composition of the materials employed in making the framework and the stacked sheets, that suitable fluxing compounds can also be used to advantage for assuring appropriate wetting of the surfaces by a solder or brazing compound employed. It is also contemplated that the headers, including the nipples, can be concurrently united with the conduits preliminarily to placing the assembled unit in the brazing furnace, whereby the entire unit is integrally united in one brazing operation. The header components can be added as sub-assemblies, if desired, to the stocked assembly prior to brazing.

In accordance with an alternative satisfactory construction comprising the present invention, the end members of the framework are defined by headers, further enhancing the simplicity and economy of the manufacture and cost of the heat exchanger apparatus. As shown in FIGS. 5 and 6, the framework consists of a pair of spaced, substantially parallel side members 48 which are formed with openings 50 adjacent to the ends thereof for encircling and engaging the projecting end portions of header conduits 52 and 54, disposed in parallel spaced relationship. Extending between the header conduits are a plurality of pairs of conduits 56, which are formed by the nesting of a plurality of transversely extending parallel spaced sheets 58 having integrally formed tubular projections thereon disposed in aligned telescopic relationship in a manner as previously discribed and as best seen in FIG. 7. The ends of the conduits 56 are connected to and flow in communication with U-shaped manifolds 60 and 62. In the specific embodiment as illustrated in FIGS. 5 and 6, the manifolds 60 are formed with tapered projections which are adapted to be slidably received by the tubular projections integrally formed in the adjacent sheet, while the manifolds 62 connected to the header 52 are formed with enlarged projections 64 for receiving the integrally formed tubular projection on the adjacent sheet 58. Each of the manifolds 60, 62 is formed with an outlet 66 at the center portion of the bight section thereof, which is adapted to extend through appropriate ports 68 formed at spaced intervals in the walls of the header conduits 52 and 54.

As shown in FIGS. 5 and 6, the header conduit 52 is provided with end caps 70 and a central plug 72 dividing the header conduit into two non-communicating compartments. One of the compartments is provided with an inlet tube 74 for delivering a fluid thereto for transmittal through the conduits 56 and into the header conduit 54. The header conduit 54 similarly is provided with end caps 78 disposed in sealing engagement therewith. The fluid upon entering the header conduit 54 passes to the left, as viewed in FIG. 5, and back into the conduits 56, and thence into the other compartment of the header conduit 52 and is removed through the outlet tube 76. The inlet tube and outlet tube are illustrated with appropriate fittings for removably connecting the heat exchanger to the fluid system.

In order to facilitate installation of the heat exchanger, four mounting straps 80 formed with mounting holes 82 are securely fixed in paired relationship, such as by means of welding, to the underside of the headers 52 and 54.

During the manufacture and assembly of the heat exchanger, as shown in FIGS. 5 and 6, the side members 48 are first positioned in overlying engaging relationship with the ends of a preliminarily formed header 52 and the manifolds 62 are placed in appropriate assembled relationship thereon. Thereafter, the appropriate number of sheets 58 are stacked in aligned nested relationship to define the conduits 56 and a suitable bonding and sealing material is placed in the interior thereof, after which the manifolds 60 are placed over the ends thereof and the preliminary assembled header conduit 54 is placed in overlying relationship with the ports 68 thereof disposed in receiving relationship relative to the outlets 66 of the manifolds 60. The openings 50 and the side members 48 are thereafter placed in overlying engaging relationship around the end portion of the header conduit 54, effecting a clamping of the stacked sheets and tubular projections thereon in appropriate parallel spaced relationship. Appropriate fluxing agents and solder or brazing materials are thereafter placed at positions contiguous to the joints to be sealed and bonded, and the assembly is placed in a brazing furnace and heated to an elevated temperature, effecting a flow of the material by capillary action, forming a rigid fluid-tight bond upon subsequent cooling of the assembly.

It will be appreciated that in the heat exchanger construction as shown in FIGS. 1-4 and FIGS. 5 and 6, the securing of the framework can be achieved concurrently with the brazing operation of the stacked sheets, or alternatively, to prevent inadvertent movement or disengagement of the frame members, the individual components can be preliminarily tack welded or brazed prior to transfer of the assembly to the brazing furnace. In the construction of the framework shown in FIGS. 1-4, it is usually necessary to preliminary braze or tack weld the framework in order to retain the sheets in appropriate clamped position. In the construction shown in FIGS. 5 and 6, on the other hand, the encircling engagement of the side members around the end portions of the header conduits enables concurrent fastening of the framework and tubular projections. It will be appreciated also that when brazed subassemblies, such as the header conduits, are employed, the bonding of the subassembly is achieved with bonding materials having a remelt temperature above that to which the assembly is subjected during the final brazing operation.

While it will be apparent that the invention disclosed herein is well calculated to fulfill the objects above stated, it will be appreciated that the invention is susceptible to modification, variation and change without departing from the proper scope or fair meaning of the subjoined claims.

What is claimed is:

1. A heat exchanger comprising a rectangular framework including a pair of side members and a pair of end members, a plurality of spaced parallel sheets of material disposed between said side members, each of said sheets having spaced integral tapered tubular projections disposed in aligned nested relationship with said tubular projections on adjacent said sheets defining therewith a plurality of conduits extending between said end members and disposed in clamped relations therebetween, a bonding and sealing material disposed in the joints formed by the nested said projections forming a fluid-tight connection, a header conduit disposed adjacent to each said end members for transferring fluid to and from said conduits, and means for connecting the respective ends of said conduits in communication with said header conduits adjacent thereto.

2. The heat exchanger as defined in claim 1, wherein said tubular projections are disposed in transversely spaced pairs defining a plurality of pairs of conduits, a manifold connecting the adjacent ends of each said pair of conduits to each other, each said manifold connected in communication with said header conduit adjacent thereto.

3. The heat exchanger as defined in claim 1, wherein the end edges of said sheet are at least partially affixed to said side members.

4. The heat exchanger defined in claim 1, wherein one said header conduit is divided into two non-communicating compartments, inlet means formed on one said compartment and outlet means formed on the other said compartment for delivering fluid to and removing the fluid from, respectively, said heat exchanger.

5. The heat exchanger as defined in claim 2, wherein each said manifold is of a U-shaped configuration having an outlet conduit extending from the outer bight portion thereof, said outlet conduit connected to said header conduit, said end members formed with a plurality of apertures therethrough for receiving said outlet conduit and for overlying said bight portion for applying a clamping force to the nested said sheets therebetween.

6. The heat exchanger as defined in claim 1, wherein said end members consist of said header conduits.

7. The heat exchanger as defined in claim 6, wherein said side members are formed with openings adjacent to the ends thereof for engageably receiving the ends of said header conduits and imposing a clamping force on the nested said sheets disposed therebetween, and means for affixing said side members to said header conduits forming a rigid framework.

References Cited

UNITED STATES PATENTS

| | | | |
|---|---|---|---|
| 1,935,332 | 11/1933 | Quarnstrom | 165—178 X |
| 2,226,243 | 12/1940 | Herz | 165—178 X |
| 2,286,271 | 6/1942 | Higham | 165—179 X |
| 3,030,782 | 4/1962 | Karmazin | 165—150 X |
| 3,250,323 | 5/1966 | Karmazin | 165—179 X |

LLOYD L. KING, Primary Examiner

T. W. STREULE, Assistant Examiner

U.S. Cl. X.R.

165—157